US012731161B2

(12) United States Patent
Wang et al.

(10) Patent No.: US 12,731,161 B2
(45) Date of Patent: Sep. 8, 2026

(54) 100-METER GRIDDED SPATIALIZATION METHOD FOR CARBON EMISSIONS OF DIFFERENT LAND USE TYPES BASED ON MULTI-SOURCE HETEROGENEOUS DATA

(71) Applicants: Guangzhou Institute of Geography, Guangdong Academy of Sciences, Guangzhou (CN); Institute of Geographic Sciences and Natural Resources Research, Chinese Academy of Sciences, Beijing (CN)

(72) Inventors: Changjian Wang, Guangzhou (CN); Yu Yang, Beijing (CN); Zeng Li, Guangzhou (CN); Yuyao Ye, Guangzhou (CN); Xia Zhou, Guangzhou (CN); Qitao Wu, Guangzhou (CN); Hong'ou Zhang, Guangzhou (CN)

(73) Assignees: Guangzhou Institute of Geography, Guangdong Academy of Sciences, Guangzhou (FR); Institute of Geographic Sciences and Natural Resources Research, Chinese Academy of Sciences, Beijing (CN)

( * ) Notice: Subject to any disclaimer, the term of this patent is extended or adjusted under 35 U.S.C. 154(b) by 134 days.

(21) Appl. No.: 18/952,278

(22) Filed: Nov. 19, 2024

(65) Prior Publication Data

US 2025/0190999 A1 Jun. 12, 2025

(30) Foreign Application Priority Data

Dec. 8, 2023 (CN) ........................ 202311678356.6

(51) Int. Cl.
*G06Q 30/00* (2023.01)
*G06Q 30/018* (2023.01)

(52) U.S. Cl.
CPC ................................ *G06Q 30/018* (2013.01)

(58) Field of Classification Search
CPC ...... G06Q 30/018; G06Q 50/26; G06N 3/006; G06N 3/084
See application file for complete search history.

(56) References Cited

U.S. PATENT DOCUMENTS 8,271,431 B1 * 9/2012 Carrington ............ G06Q 10/10 705/28
8,655,791 B2 * 2/2014 Zimmerman .......... G06Q 10/06 703/2

(Continued)

FOREIGN PATENT DOCUMENTS

CN 114004278 A * 2/2022 ............ G06F 18/25
CN 115408439 A * 11/2022 ....... G06Q 10/06315

(Continued)

OTHER PUBLICATIONS

Lou, Ge, et al. "Using nighttime light data and POI big data to detect the urban centers of Hangzhou." Remote Sensing 11.15 (2019): 1821. (Year: 2019).*

(Continued)

*Primary Examiner* — Luis A Brown
(74) *Attorney, Agent, or Firm* — Tutunjian & Bitetto, P.C.

(57) ABSTRACT

A 100-meter gridded spatialization method for carbon emissions of different land use types based on multi-source heterogeneous data is provided, including the following steps: S1, fitting Luojia-1A Satellite nighttime light data year by year with defense meteorological satellite program-operational linescan system (DMSP-OLS) and national polar-orbiting partnership-visible infrared imaging radiometer (NPP-VIIRS) fused 1-kilometer gridded nighttime light data, performing additive fusion on previous light data and current light data, introducing a time inertia weight factor to improve particle swarm optimization-back propagation (BP)

(Continued)

neural network algorithm, and forming 100-meter nighttime light data correctable on a long time series; and S2, simulating a complex nonlinear dynamic changing relationship between multilevel 100-meter gridded data of different land use types in different industries and energy carbon emissions in different industries based on the 100-meter nighttime light data, and establishing a 100-meter spatialization inversion model for energy carbon emissions of different land use types in different industries.

16 Claims, 13 Drawing Sheets

(56) References Cited

U.S. PATENT DOCUMENTS

| | | | | |
|---|---|---|---|---|
| 2014/0201667 | A1 * | 7/2014 | Schoeberl | G06F 3/04842<br>715/771 |
| 2019/0283745 | A1 * | 9/2019 | Nagel | G08G 1/0112 |
| 2023/0385738 | A1 * | 11/2023 | Lobell | G06N 20/00 |
| 2024/0242289 | A1 * | 7/2024 | Jiang | G06Q 40/08 |

FOREIGN PATENT DOCUMENTS

| | | | | |
|---|---|---|---|---|
| CN | 113554356 B | * | 6/2023 | G06Q 10/06315 |
| CN | 116630155 A | * | 8/2023 | G06T 3/4053 |
| WO | WO-2020126801 A1 | * | 6/2020 | G06Q 30/0202 |

OTHER PUBLICATIONS

Lao, Jieying, et al. “Land use simulation of Guangzhou based on nighttime light data and planning policies.” Remote Sensing 12.10 (2020): 1675. (Year: 2020).*

Huang, Xin, et al. “Urban functional zone mapping by integrating high spatial resolution nighttime light and daytime multi-view imagery.” ISPRS Journal of Photogrammetry and Remote Sensing 175 (2021): 403-415. (Year: 2021).*

Yu, Bo, et al. “Temporal expansion of the nighttime light images of SDGSAT-1 satellite in illuminating ground object extraction by joint observation of NPP-VIIRS and sentinel-2A images.” Remote Sensing of Environment 295 (2023): 113691. (Year: 2023).*

He, Xiong, et al. “Using wavelet transforms to fuse nighttime light data and POI big data to extract urban built-up areas.” Remote Sensing 12.23 (2020): 3887. (Year: 2020).*

He, Xiong, Zhiming Zhang, and Zijiang Yang. “Extraction of urban built-up area based on the fusion of night-time light data and point of interest data.” Royal Society Open Science 8.8 (2021): 210838. (Year: 2021).*

Zuo, Chen, et al. “Correlation analysis of CO2 concentration based on DMSP-OLS and NPP-VIIRS integrated data.” Remote Sensing 14.17 (2022): 4181. (Year: 2022).*

Meng, Hongzhi, et al. “Spatiotemporal heterogeneity of the characteristics and influencing factors of energy-consumption-related carbon emissions in Jiangsu province based on DMSP-OLS and NPP-VIIRS.” Land 12.7 (2023): 1369. (Year: 2023).*

Yang, Di, et al. “Modeling and spatio-temporal analysis of city-level carbon emissions based on nighttime light satellite imagery.” Applied Energy 268 (2020): 114696. (Year: 2020).*

* cited by examiner

100-METER GRIDDED SPATIALIZATION METHOD FOR CARBON EMISSIONS OF DIFFERENT LAND USE TYPES BASED ON MULTI-SOURCE HETEROGENEOUS DATA

CROSS REFERENCE TO RELATED APPLICATION

This patent application claims the benefit and priority of Chinese Patent Application No. 202311678356.6, filed with the China National Intellectual Property Administration on Dec. 8, 2023, the disclosure of which is incorporated by reference herein in its entirety as part of the present application.

TECHNICAL FIELD

The present disclosure relates to the spatialization technology by fusion of multi-source heterogeneous data, and in particular, to a 100-meter gridded spatialization method for carbon emissions of different land use types based on multi-source heterogeneous data.

BACKGROUND

At present, carbon emission accounting system is mainly directed against three types of accounting objects at a regional (national and local) level, an industry and enterprise level, and a product level from the statistical perspective, and is short of system accounting in a spatial dimension, resulting in unclear spatial distribution of carbon emissions, unknown spatial mechanism, and weak spatial regulation capability. This is not conducive to accurate implementation of "carbon peaking and carbon neutrality" goals. There is an urgent need to carry out research on carbon emission spatial accounting method systems.

However, for traditional carbon emission accounting based on Intergovernmental Panel on Climate Change (IPCC) Guidelines for Greenhouse Gas Inventories, administrative regions are mostly used as basic statistical units, and carbon emission data mainly on global, intercontinental, and international scales, and subnational, regional, urban, and prefectural scales are relatively scarce. Internationally, there are two common sensors for detecting nighttime light intensity on the earth's surface: one is defense meteorological satellite program-operational linescan system (DMSP-OLS), and the other one is national polar-orbiting partnership-visible infrared imaging radiometer (NPP-VIIRS) on suomi national polar-orbiting partnership (SNPP) satellite. However, nighttime light data from the two sensors are inconsistent in temporal and spatial resolutions with a maximum resolution of 500 m. Existing studies are mostly based on DMSP-OLS and NPP-VIIRS nighttime light data, have limitations of low spatial resolutions (500 m or 1 km), and still cannot meet application requirements of the real society. Luojia-1A Satellite developed dominantly by China is the first professional nighttime light remote sensing satellite in the world with a spatial resolution of up to 130 m. However, Luojia-1A Satellite, which started to shoot images from 2018, has the disadvantage of short time scale and cannot meet the requirement of long-term continuity of nighttime light. At present, due to lack of a uniform spatial datum for carbon emission data of different scales and different sectors, there is an urgent need to carry out systematic and comprehensive spatial-dimension carbon emission accounting in order to resolve the technical problems of unclear spatial distribution of carbon emissions, unknown spatial mechanism, and weak spatial regulation capability.

Land use and natural resource governance are important constituent parts of carbon emissions and carbon mitigation. Currently there are few studies on energy-related carbon emission and land use modeling with land types as bearing spaces. Existing studies further have shortcomings in the following two aspects: first, there are insufficient studies on carbon emission spatialization, and spatially direct association relationships of carbon emissions with various land elements and evolution laws are not visually reflected; and second, there are insufficient studies on fusion of carbon emission data and territorial spatial planning, and it is difficult to realize collaborative governance of carbon emissions and territorial spatial planning. Since carbon emissions of various land types within a city or a county are not distinguished in previous studies, these studies cannot reflect carbon emission differences of different land use types between industries, and fail to provide valid data references and supports for carbon emission space quotas for various industries on fine scales, industrial structure optimization within a city, and energy conservation and emission reduction.

SUMMARY

An objective of the present disclosure is to provide a 100-meter gridded spatialization method for carbon emissions of different land utilization types based on multi-source heterogeneous data to overcome the shortcomings of the prior art.

To achieve the above objective, the present disclosure adopts the following technical solutions:

A 100-meter gridded spatialization method for carbon emissions of different land use types based on multi-source heterogeneous data includes the following steps:

S1, fitting Luojia-1A Satellite nighttime light data year by year with defense meteorological satellite program-operational linescan system (DMSP-OLS) and national polar-orbiting partnership-visible infrared imaging radiometer (NPP-VIIRS) fused 1-kilometer gridded nighttime light data, performing additive fusion on previous light data and current light data, introducing a time inertia weight factor to improve particle swarm optimization-back propagation (BP) neural network algorithm, and forming 100-meter nighttime light data correctable on a long time series; and

S2, simulating a complex nonlinear dynamic changing relationship between multilevel 100-meter gridded data of different land use types in different industries and energy carbon emissions in different industries based on the 100-meter nighttime light data, and establishing a 100-meter spatialization inversion model for energy carbon emissions of different land use types in different industries to achieve a high 100-meter gridded spatial resolution of energy carbon emissions.

Further, the step S1 includes:

S11, collecting multi-source heterogeneous remote sensing data and statistical data, where the multi-source heterogeneous data and the statistical data include DMSP-OLS nighttime light data, NPP-VIIRS nighttime light data, Luojia-1A Satellite nighttime light data, gridded gross domestic product (GDP) data, gridded population data, gridded land use data, and carbon emission data of different energy sources in different industries accounted based on the statistical data;

S12: preprocessing the multi-source heterogeneous data to obtain an initial dataset;

S13, sequentially performing inter-sensor mutual correction, intra-annual image fusion, and inter-annual image continuity correction on the DMSP-OLS nighttime light data in the initial dataset, and removing outliers from the NPP-VIIRS nighttime light data in the initial dataset; performing inter-annual long time series continuous correction on the preprocessed DMSP-OLS nighttime light data and NPP-VIIRS nighttime light data, and accomplishing matching and fusion of the light data; and S14, with the Luojia-1A Satellite nighttime light data as a basis of reference, establishing a multilevel model for each year by the particle swarm optimization-BP neural network algorithm improved with the introduced time inertia weight factor $\omega_{t+}$, and achieving downscaling processing from 1-kilometer gridded data to 100-meter gridded data, thereby obtaining 100-meter nighttime light data continuous on a long time series.

Further, the step S2 includes:

S21, changing a grid resolution and performing projection setting for the 100-meter nighttime light data, the gridded GDP data, and the gridded population data to form a multi-dimensional dataset of a uniform resolution and projection; reclassifying land use types of a provincial administrative region by industry, and screening corresponding sector data including multilevel 100-meter gridded data of urban land, industrial land, transportation land, rural living land, and agricultural land;

S22, carrying out zonal statistics for the multilevel 100-meter gridded data using spatial overlay and extraction by mask of ArcGIS 10.2 software according to a provincial administrative boundary, and acquiring nighttime light, GDP, and total population of provincial-scale multilevel gridded data of all years; and S23, simulating a complex nonlinear fitting dynamic changing relationship between multilevel 100-meter gridded datasets extracted from different land use types and energy carbon emissions in different industries acquired based on provincial-scale statistics, and establishing a 100-meter gridded spatialization inversion model for energy carbon emissions of different land use types in different industries.

Further, the multilevel model for each year established by the particle swarm optimization-BP neural network algorithm improved with the introduced time inertia weight factor $\omega_{t+}$ in the step S14 is as follows:

$$DN_{i,d}^{t+1} = \omega_{v_{i,d}}^{t+1} + c_1 rand()\left(DN_{i,value}^{t} + DN_{i,value}^{t-1}\right) + c_2 rand()\left(DN_{g,value}^{t} + DN_{i,value}^{t-1}\right)$$

$$\omega = \omega_{max} - t \cdot \frac{\omega_{max} - \omega_{min}}{t_{max}}$$

where $c_1$ and $c_2$ are learning factors; rand( ) is a random number in a range of (0,1);

$$DN_{i,d}^{t+1}$$

represents 100-meter light data of different regions in a simulation year; and $\omega_{t+}$ represents the time inertia weight factor that changes over time and is weighed year by year.

Further, a nonlinear fitting method of extreme gradient boosting (XGBoost) regression uses weighted voting for combined strategy decision making:

$$H(x) = c_j^{argmax} \sum_{i=1}^{T} \omega_i h_i^j(x)$$

where $\omega_i$ is a weight of an individual learner $h_i$ that fits carbon emissions of different land use types in different industries; and $\omega_i$ is typically required to be greater than or equal to 0, $$\sum_{i=1}^{T} \omega_i = 1.$$

Further, the preprocessing in the step S12 includes resampling, mosaicking, clipping, spatial overlay, and mask processing.

Further, intra-annual fusion is performed on effect data detected by two different sensors in a same year from the DMSP-OLS nighttime light data using the ArcGIS 10.2 software, and a specific calculation formula is as follows:

$$\left\{\begin{aligned} & DN_{(n,i)} = 0, \text{ when } DN_{(n,i)}^{a} = 0 \text{ or } DN_{(n,i)}^{b} = 0 \\ & DN_{(n,i)} = \frac{DN_{(n,i)}^{a} + DN_{(n,i)}^{b}}{2}, \text{ others} \end{aligned}\right\}.$$

Further, a specific calculation formula for the performing inter-annual long time series continuous correction on the preprocessed DMSP-OLS nighttime light data and NPP-VIIRS nighttime light data is as follows:

$$\left\{\begin{aligned} & DN_{(n,i)} = 0, \text{ when } DN_{(n+1,i)} = 0 \\ & DN_{(n,i)} = DN_{(n-1,i)}, \text{ when } DN_{(n+1,i)} > 0 \text{ and } DN_{(n-1,i)} > DN_{(n,i)} \\ & DN_{(n,i)} = DN_{(n,i)}, \text{ others} \end{aligned}\right\}.$$

Further, the method further includes:

acquiring actual statistical quantities of energy carbon emissions in different industries in some regions, comparing the actual statistical quantities in different industries with carbon emissions of the selected regions estimated by the 100-meter spatialization inversion model for energy carbon emissions of different land use types in different industries, and verifying the reliability of the 100-meter spatialization inversion model for energy carbon emissions of different land use types in different industries.

Compared with the prior art, the present disclosure has the following beneficial effects:

1. In embodiments of the present disclosure, multi-source heterogeneous data is acquired. After DMSP-OLS and NPP-VIIRS nighttime light data is fused and corrected, a particle swarm optimization-BP neural network algorithm improved with a time inertia weight factor is further introduced to establish a multilevel model for each year. Downscaling processing from 1-kilometer gridded data to 100-meter gridded nighttime light data is achieved. Long time series nighttime light data research is realized. Valid data support is provided for fine-scale carbon emission space quotas and energy conservation and emission reduction in an administrative region.

2. A 100-meter high resolution spatialization and complex nonlinear dynamic changing inversion model for energy carbon emissions of different land use types in different industries is established. According to a multilevel grid input factor, carbon emissions of different land use types in different industries in any region can be estimated with fused 100-meter nighttime light data and gridded GDP and population data. Carbon emissions of various land use types in regional, provincial, urban, and prefectural administrative regions can be clear. A new research approach is provided for low-carbon industrial distribution and "one map" construction of space of national land.

BRIEF DESCRIPTION OF THE DRAWINGS

To describe the technical solutions in the embodiments of the present application more clearly, the drawings required for describing the embodiments are briefly described below. Apparently, the drawings in the following description show merely some embodiments of the present application, and those of ordinary skill in the art may still derive other drawings from these drawings without creative efforts.

DETAILED DESCRIPTION OF THE EMBODIMENTS

Embodiments

The technical solutions of the present disclosure will be further described below in conjunction with the accompanying drawings and embodiments.

To make the objective, technical solutions, and advantages of the present disclosure clearer, the present disclosure is further described in detail below with reference to the drawings and embodiments. It should be understood that the specific embodiments described herein are merely used to explain the present disclosure, rather than to limit the present disclosure.

The present disclosure provides a 100-meter gridded spatialization method for carbon emissions of different land utilization types based on multi-source heterogeneous data. By establishing an inversion model for fused 100-meter nighttime light data, gridded GDP and population data, and carbon emissions accounted based on provincial-scale statistical data, 100-meter gridded carbon emissions of different land use types in different industries in any region can be acquired according to digital number (DN) values of nighttime light data and gridded GDP and population datasets.

The present disclosure puts forward a hypothesis that the nighttime light data DN values, GDPs and populations born by different land use types are in a complex nonlinear dynamic changing relationship with carbon emissions. Inversion using a traditional econometric model may cause a large error. Therefore, an inversion model for carbon emissions is established using a plurality of artificial intelligence algorithms.

It needs to be noted that carbon emissions, carbon dioxide emissions, and $CO_2$ emissions mentioned in the embodiments of the present disclosure are all carbon dioxide emissions.

Figure 1:
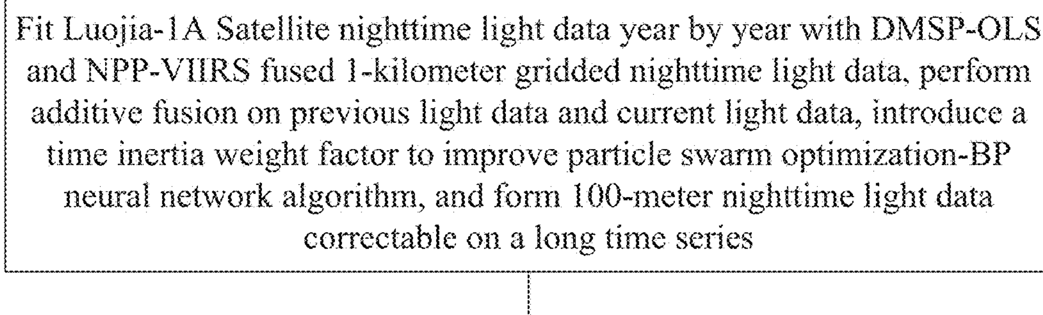
FIG. 1 is a simple flowchart of a 100-meter gridded spatialization method for carbon emissions of different land use types based on multi-source heterogeneous data provided in an embodiment of the present disclosure.
Figure 2A:
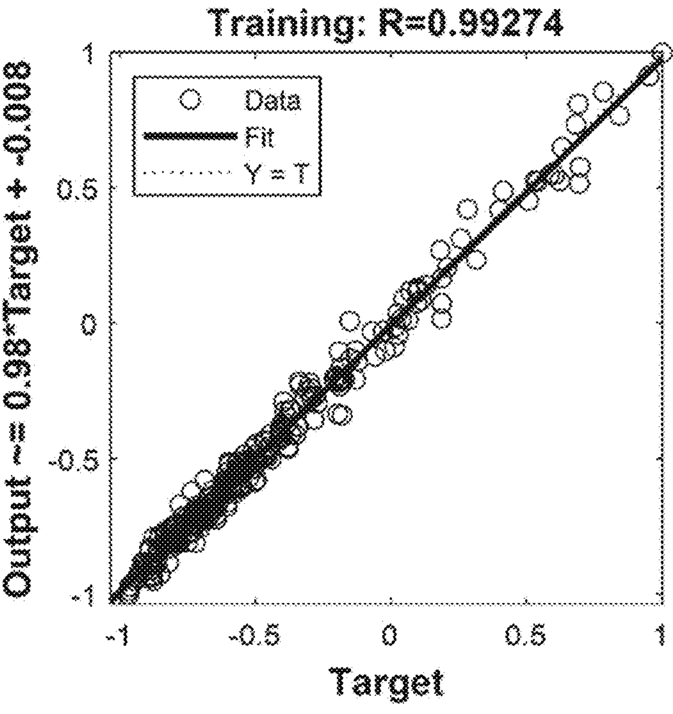
FIGS. 2A-2D are schematic diagram illustrating XGBoost regression of carbon emissions in different industries and a multilevel gridded data factor and test results provided in an embodiment of the present disclosure.
Figure 2B:
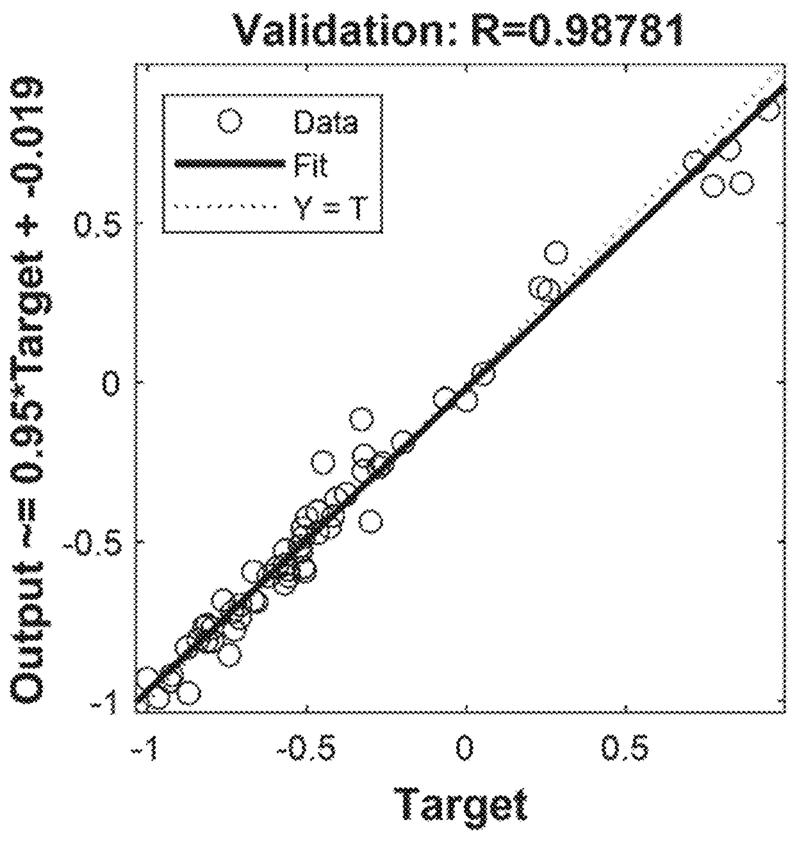
Figure 2C:
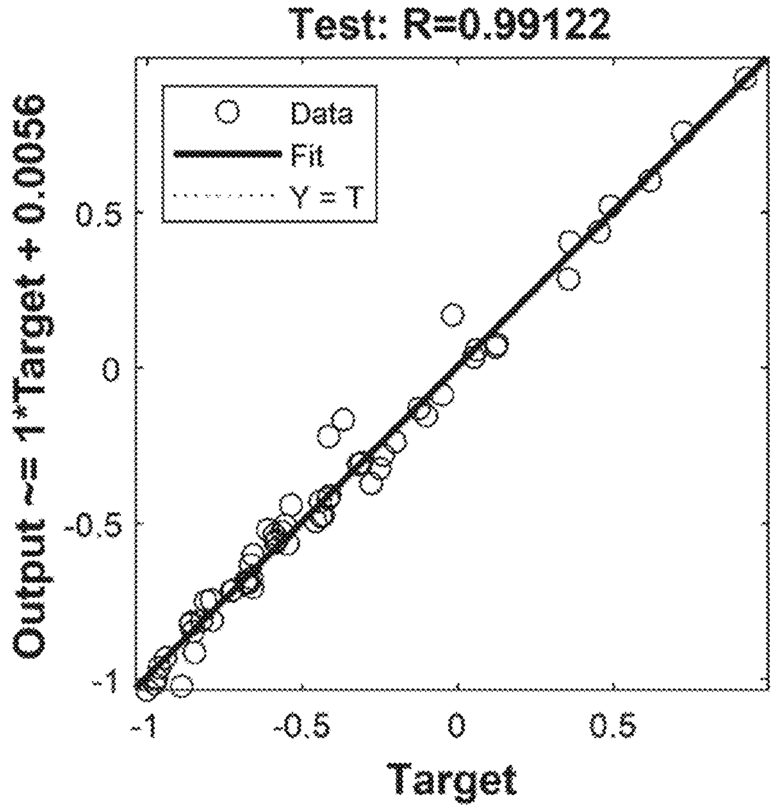
Figure 2D:
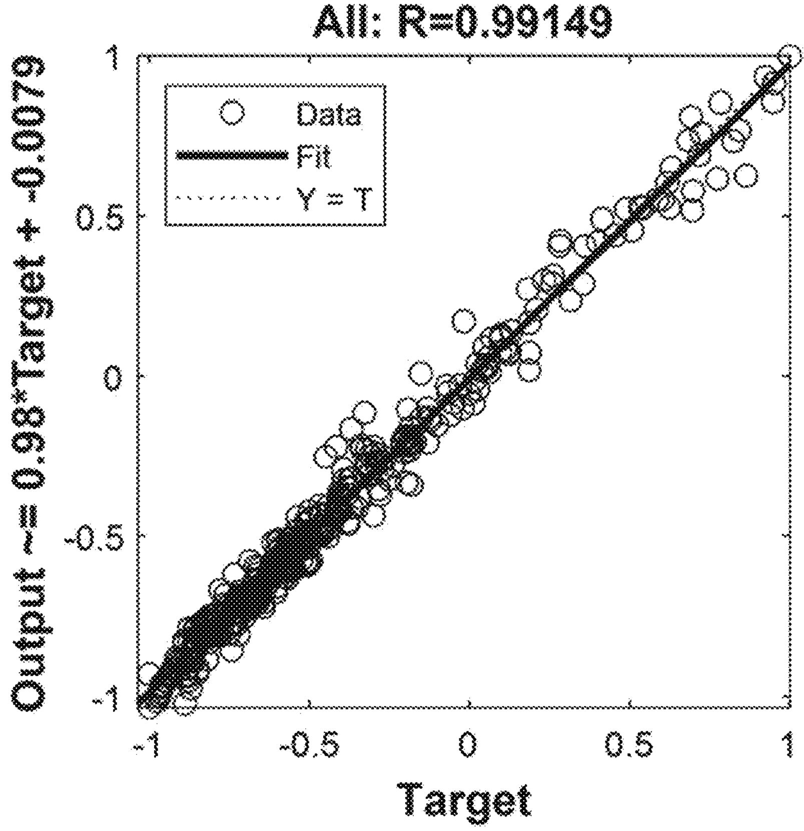

As shown in FIG. 1, the overall idea of the 100-meter gridded spatialization method for carbon emissions of different land utilization types based on multi-source heterogeneous data includes the following steps.

In the step S1, Luojia-1A Satellite nighttime light data is fitted year by year with DMSP-OLS and NPP-VIIRS fused 1-kilometer gridded nighttime light data; additive fusion is performed on previous light data and current light data; a time inertia weight factor is introduced to improve particle swarm optimization-BP neural network algorithm; and 100-meter nighttime light data correctable on a long time series is formed.

As such, valid data support can be provided for fine-scale carbon emission quotas and energy conservation and emission reduction in an administrative region through this step.

S2, a complex nonlinear dynamic changing relationship between multilevel 100-meter gridded data of different land use types in different industries and energy carbon emissions in different industries is simulated based on the 100-meter nighttime light data, and a 100-meter spatialization inversion model for energy carbon emissions of different land use types in different industries is established to achieve a high 100-meter gridded spatial resolution of energy carbon emissions.

As such, by this step, carbon emissions of different land use types in different industries in any region can be estimated. Carbon emissions of various land use types in regional, provincial, urban, and prefectural administrative regions can be clear. A new research approach is provided for low-carbon industrial distribution and "one map" construction of space of national land.

In a specific embodiment, the step S1 includes the following steps.

In the step S11, multi-source heterogeneous remote sensing data and statistical data are collected, where the multi-source heterogeneous data and the statistical data include DMSP-OLS nighttime light data, NPP-VIIRS nighttime light data, Luojia-1A Satellite nighttime light data, gridded gross domestic product (GDP) data, gridded population data, gridded land use data, and carbon emission data of different energy sources in different industries accounted based on the statistical data;

In the step S12, the multi-source heterogeneous remote sensing data is preprocessed (such as reprojected, resampled, mosaicked, and clipped) using ArcGIS 10.2 software to obtain an initial dataset.

In the step S13, inter-sensor mutual correction, intra-annual image fusion, and inter-annual image continuity correction are sequentially performed on the DMSP-OLS nighttime light data in the initial dataset, and outliers are removed from the NPP-VIIRS nighttime light data in the initial dataset; inter-annual long time series continuous correction is performed on the preprocessed DMSP-OLS nighttime light data and NPP-VIIRS nighttime light data, and matching and fusion of the light data are accomplished.

Specifically, in this embodiment, limited by sensors, the DMSP-OLS data cannot record a pixel light value greater than 63, and thus needs to be corrected. A region having stable overall social economy and light DN value is selected as an unchanged region and F162007 dataset is selected as a reference dataset. Saturation pixel correction is performed on the nighttime light DN values of the unchanged region in all years and the reference dataset. For the removal of the outliers of NPP-VIIRS nighttime light images, the nighttime light DN value of cities such as Beijing, Shanghai, Guangzhou, and Shenzhen is used as a threshold for China region DN values, and the DN value less than 0 is normalized to 0.

The image data of a same year in the DMSP-OLS nighttime light data is from two different sensors with differences and thus needs to be subjected to mean processing. Intra-annual fusion is performed on effect data detected by two different sensors in a same year from the DMSP-OLS nighttime light data using the ArcGIS 10.2 software, and a specific calculation formula is as follows:

$$\begin{Bmatrix} DN_{(n,i)} = 0, \text{ when } DN^a_{(n,i)} = 0 \text{ or } DN^b_{(n,i)} = 0 \\ DN_{(n,i)} = \dfrac{DN^a_{(n,i)} + DN^b_{(n,i)}}{2}, \text{ others} \end{Bmatrix}$$

Since the development of urbanization of China progresses steadily, the nighttime light brightness and area within an urban boundary will be caused to widen continuously. In a generation process of the nighttime light data, the detected positions of some light spots might be unclear, leading to a fuzziness or missing problem. A real situation cannot be reflected such that a light change trend is inconsistent with an actual development law. Therefore, in a nighttime light processing process, a general principle is that the DN value of images of earlier years is less than the DN value of images of later years, and for missing or fuzzy unstable pixels in some images, the DN value may be replaced with value 0. Thus, long time series correction on the DMSP-OLS and NPP-VIIRS nighttime light data is accomplished, and the specific calculation formula is as follows:

$$\begin{Bmatrix} DN_{(n,i)} = 0, \text{ when } DN_{(n+1,i)} = 0 \\ DN_{(n,i)} = DN_{(n-1,i)}, \text{ when } DN_{(n+1,i)} > 0 \text{ and } DN_{(n-1,i)} > DN_{(n,i)} \\ DN_{(n,i)} = DN_{(n,i)}, \text{ others} \end{Bmatrix}$$

Smoothing processing is performed on the time series corrected NPP-VIIRS nighttime light images using a Gaussian low-pass filter, and specific parameters are set to 5*5 window and sigma 1.75 such that the Gaussian low-pass filter can match DMSP-OLS images.

DMSP-OLS and NPP-VIIRS nighttime light data is fused to form a long-time continuously corrected DMSP-OLS like 1-kilometer gridded dataset. Zonal statistics is carried out for the smoothed NPP-VIIRS data and the preprocessed DMSP-OLS data using the ArcGIS 10.2 software; county-scale average nighttime light DN values of two types of nighttime light data in coincident years (2012 and 2013) are acquired, and two nighttime light datasets are obtained.

Using a particle swarm optimization (PSO)-BP learning method, two nighttime light data fusion models are established with county-scale nighttime light datasets of 2012 and 2013, respectively. Fusion correction is performed with selected optimal parameters to obtain a continuously comparable long time series nighttime light dataset.

In the step S14, with the Luojia-1A Satellite nighttime light data as a basis of reference, a multilevel model for each year is established by the particle swarm optimization-BP neural network algorithm improved with the introduced time inertia weight factor $\omega_{t+}$, and downscaling processing from 1-kilometer gridded data to 100-meter gridded data is achieved, thereby obtaining 100-meter nighttime light data continuous on a long time series.

Specifically, in this embodiment, the used Luojia-1A Satellite nighttime light data is from nationwide nighttime light "one map" released by State Key Laboratory of Information Engineering in Surveying, Mapping and Remote Sensing of Wuhan University, which is formed with images shoot by Luojia-1A Satellite during a period from June 2018 to December 2018. Reprojection and mosaicking processing is performed on a plurality of images to form image data of uniform spatial reference.

Zonal statistics is carried out for the fused 1-kilometer gridded nighttime light data (DMSP-OLS like nighttime light data) and mosaicked uniform Luojia-1A Satellite nighttime light data using the ArcGIS 10.2 software; the county-scale average nighttime light DN value of two types of nighttime light data is acquired, and the county-scale average DN value (2000-2020) of the DMSP-OLS like nighttime light data and the county-scale average DN value (2018) of the Luojia-1A Satellite nighttime light data are obtained.

Two nighttime light data fusion models are established. By the particle swarm optimization-BP neural network algorithm improved with the introduced time inertia weight factor $\omega_{t+}$, the multilevel model for each year matching the county-scale Luojia-1A Satellite nighttime light DN values is established with the fused DMSP-OLS like nighttime light data. Since the nighttime light brightness increases and the area widens continuously with the development of urbanization of a region, the nighttime light has a year-by-year additive and relatively stable change trend. In a correction process, the light data of next year is greater than the data of a previous year. When fitting the light data of the Luojia-1A Satellite year by year, in consideration of the continuous comparability of nighttime light and the limitations of annual Luojia-1A Satellite nighttime light data, in order to further expand a data volume and enhance model fitting accuracy, additive fusion is performed on the fitted light data of earlier years and current Luojia-1A Satellite light data for inversion of the current 100-meter light data, and the time inertia weight factor $\omega_{t+}$ is introduced to improve the optimization algorithm, as shown below:

$$DN_{i,d}^{t+1} = \omega v_{i,d}^{t+1} + c_1 rand()\left(DN_{i,value}^{t} + DN_{i,value}^{t-1}\right) + c_2 rand()\left(DN_{g,value}^{t} + DN_{i,value}^{t-1}\right)$$

$$\omega = \omega_{max} - t \cdot \frac{\omega_{max} - \omega_{min}}{t_{max}}$$

where $c_1$ and $c_2$ are learning factors; rand( ) is a random number in a range of (0,1);

$$DN_{i,d}^{t+1}$$

represents 100-meter light data of different regions in a simulation year; and $\omega_{t+}$ represents the time inertia weight factor that changes over time and is weighed year by year.

With the average DN value of the fused DMSP-OLS type nighttime light data, central geographical coordinates (X, Y) of a county, and an area of the county as an input layer and the average DN value of the Luojia-1A Satellite nighttime light as an output layer, logarithmic processing is performed on the data in order to improve the accuracy of the model. Fitting is performed using MATLAB software. C1 and C2 are set to 3. A maximum number of iterations is set to 200. A population quantity is set to 20. One neural layer and 5 neurons are set. Training samples and test samples are set according to a specific number of samples. After the completion of fitting, continuous correction is further performed on inter-annual nighttime light images and downscaling processing from 1-kilometer gridded data to 100-meter gridded data is achieved, thereby obtaining a 100-meter nighttime light dataset continuously comparable on a long time series. Fitting results are as shown in Table 1.

TABLE 1

| Nighttime Light Image | $R^2$ |
|---|---|
| 2000 | 0.97 |
| 2001 | 0.97 |
| 2002 | 0.95 |
| 2003 | 0.95 |
| 2004 | 0.95 |
| 2005 | 0.96 |
| 2006 | 0.97 |
| 2007 | 0.96 |
| 2008 | 0.97 |
| 2009 | 0.95 |
| 2010 | 0.96 |
| 2011 | 0.96 |

TABLE 1-continued

| Nighttime Light Image | $R^2$ |
|---|---|
| 2012 | 0.98 |
| 2013 | 0.98 |
| 2014 | 0.96 |
| 2015 | 0.98 |
| 2016 | 0.97 |
| 2017 | 0.96 |
| 2018 | 0.96 |
| 2019 | 0.97 |
| 2020 | 0.97 |

In a specific embodiment, the step S2 further includes the following steps.

In the step S21, a grid resolution is changed and a projection is set for the 100-meter nighttime light data, the gridded GDP data, and the gridded population data to form a multi-dimensional dataset of a uniform resolution and projection; land use types of a provincial administrative region are reclassified by industry, and corresponding sector data is screened, including multilevel 100-meter gridded data of urban land, industrial land, transportation land, rural living land, and agricultural land.

In the step S22, zonal statistics is carried out for the multilevel 100-meter gridded data using spatial overlay and extraction by mask of ArcGIS 10.2 software according to a provincial administrative boundary, and nighttime light, GDP, and total population of provincial-scale multilevel gridded data of all years are acquired.

Specifically, in this embodiment, the land use data is from Resources and Environmental Science Data Center of Chinese Academy of Sciences. The spatial resolution of the data is relatively high (30 m*30 m). Land uses are classified in detail, which, according to their types and research needs, reclassified into five types: urban land, industrial land, transportation land, rural living land, and agricultural land, as mask variables. Zonal statistics is carried out for the provincial-scale multilevel 100-meter gridded dataset (nighttime light data and gridded GDP and population data) by the functions of spatial overlay and extraction by mask of the ArcGIS 10.2 software, and provincial-scale nighttime light, GDP, and total population of all years are acquired.

According to a basic carbon accounting equation provided by the IPCC, average lower heating values of and carbon contents of unit heat values of different types of energy for different sectors are multiplied by a carbon oxidation ratio to obtain energy carbon emission factors. Energy consumptions are multiplied by the energy carbon emission factors and also by a molecular weight ratio of $CO_2$ to C to obtain carbon dioxide carbon emissions of different types of energy and different sectors. Provincial-scale energy balance table data is collected from China energy statistical yearbook, and divided into primary energy consumption and energy end-use consumption. Secondly, an output of industrial products is obtained from a provincial statistical yearbook. Carbon emissions of different energy sources are accounted for net consumptions of 3 fossil energy sources by using a carbon emission inventory compiling method according to an IPCC energy carbon emission accounting formula, and carbon emissions of sectors are accounted by sector and fossil fuel consumption using a sector method. For accounting of an industrial process, activities of corresponding industrial products of cement and steel are multiplied by corresponding carbon emission factors to obtain the carbon dioxide emissions of the industrial process. Finally, the carbon emissions of sectors are combined with the carbon emissions of the industrial production process to form the carbon emissions of different sectors, thereby forming 2000-2020 accounting inventory of carbon emissions in different industries.

In the step S23, a complex nonlinear fitting dynamic changing relationship between multilevel 100-meter gridded datasets extracted from different land use types and energy carbon emissions in different industries acquired based on provincial-scale statistics is simulated using a nonlinear fitting method of XGBoost regression, and a 100-meter gridded spatialization inversion model for energy carbon emissions of different land use types in different industries is established.

Specifically, the nonlinear fitting method of XGBoost regression is an integrated learning algorithm based on a decision-making tree algorithm. A decision-making tree is of a tree structure, where each internal node represents one feature or attribute. A dataset may be divided into a plurality of subsets by the decision-making tree, and the subsets are classified or regressed. With a gain ratio of an information entropy, combined strategy decision making is performed by weighted voting:

$$H(x) = c_j^{argmax} \sum_{i=1}^{T} \omega_i h_i^j(x)$$

where $\omega_i$ is a weight of an individual learner $h_i$ that fits carbon emissions of different land use types in different industries; and $\omega_i$ is typically required to be greater than or equal to 0, $$\sum_{i=1}^{T} \omega_i = 1.$$

A running environment for the XGBoost regression method is set up by using python software, and with the gain ratio of the information entropy, combined strategy decision making is performed by weighted voting. The fused 100-meter nighttime light and gridded GDP and population dataset is selected as an input layer, and carbon emissions of different energy sources in different industries acquired by provincial statistics are selected as an output layer. 80% of samples are selected as training samples, and 20% of samples are set as test samples. A number of cross-validation iterations is 10. Random simulation is performed for 10000 times. A number "n_estimators" of decision-making trees is 200. A maximum number of features considered when establishing an optimal decision-making tree model is selected as "auto", and a minimum number of samples that a node can be separated into is 2.

Figure 3:
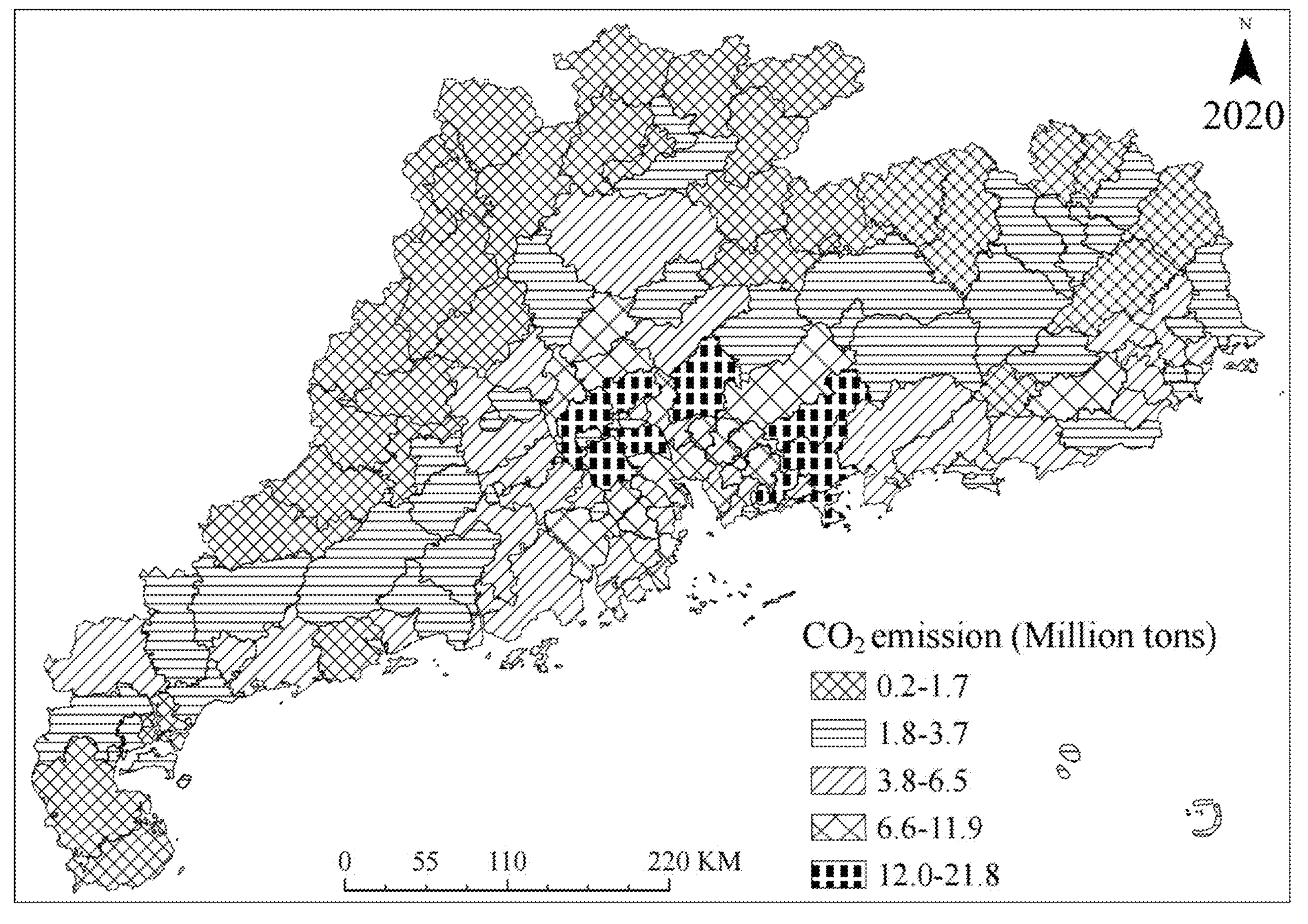
FIG. 3 is a schematic diagram illustrating carbon emissions statistics for counties in Province A of a certain country in 2020 based on 100-meter gridded data in an embodiment of the present disclosure.
Figure 4:
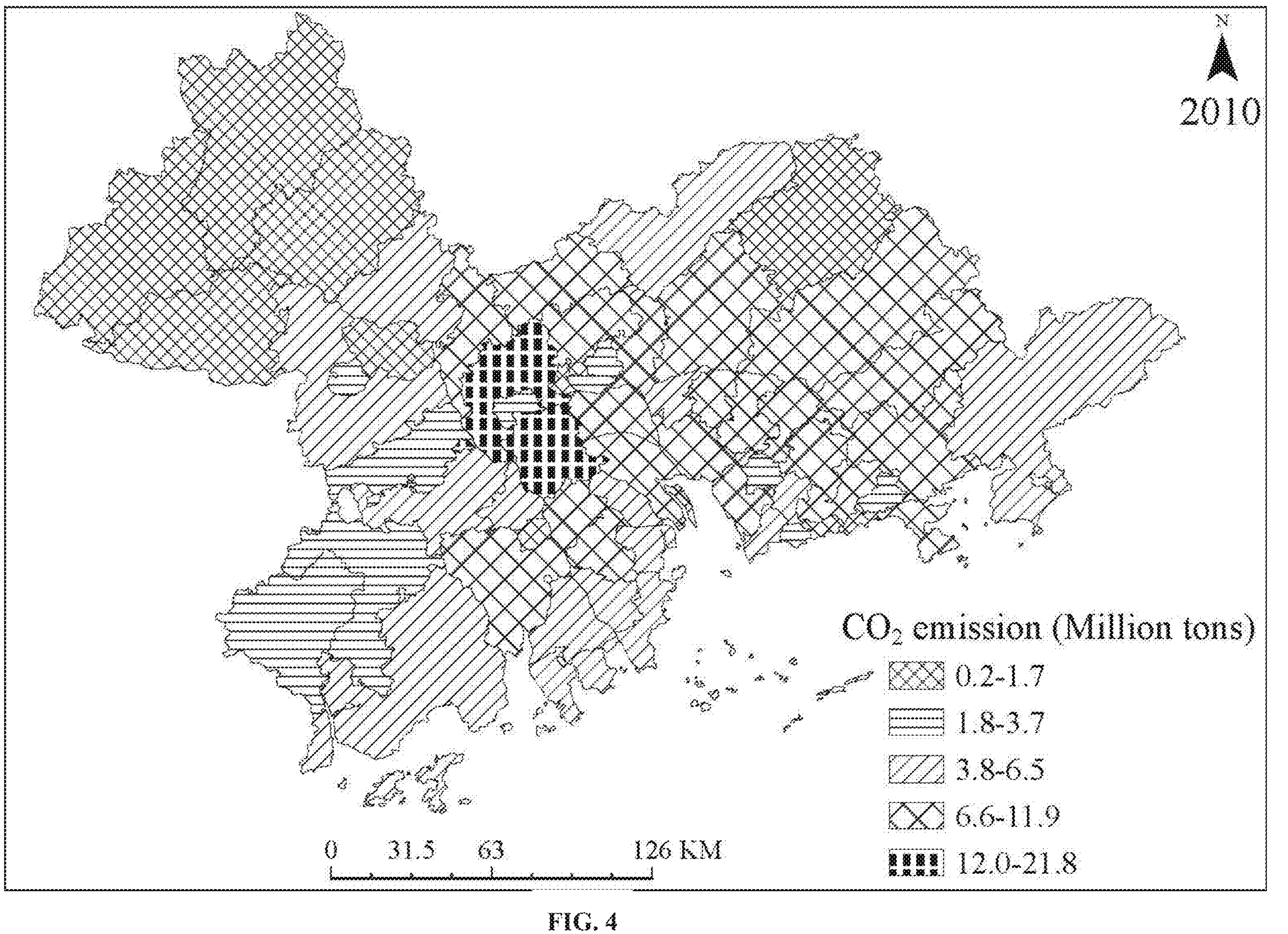
FIG. 4 is a schematic diagram illustrating carbon emissions statistics for countries of city cluster B in 2020 based on 100-meter gridded data simulated in an embodiment of the present disclosure.
Figure 5:
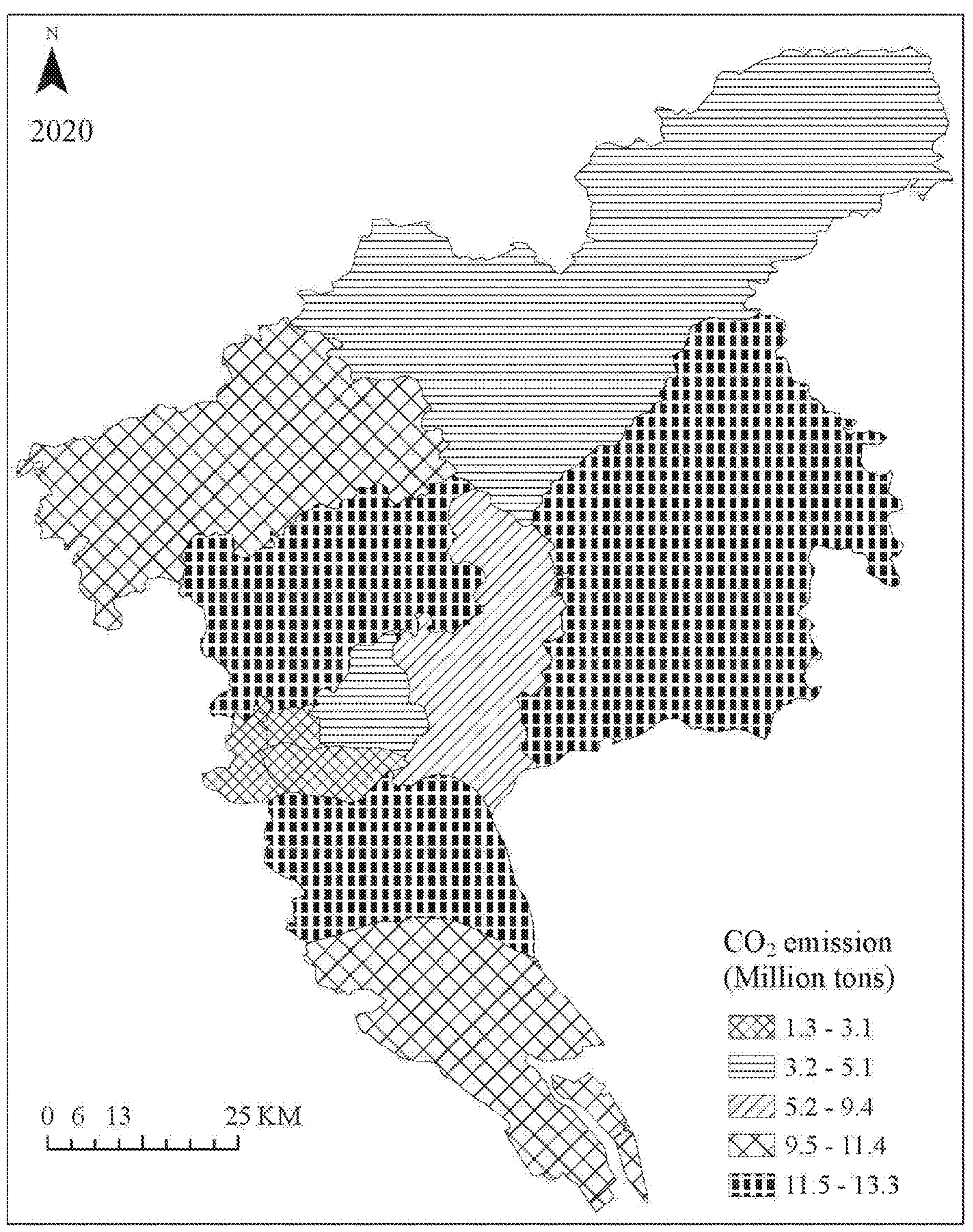
FIG. 5 is a schematic diagram illustrating carbon emissions statistics for countries of city C in 2020 based on 100-meter gridded data simulated in an embodiment of the present disclosure.
Figure 6:
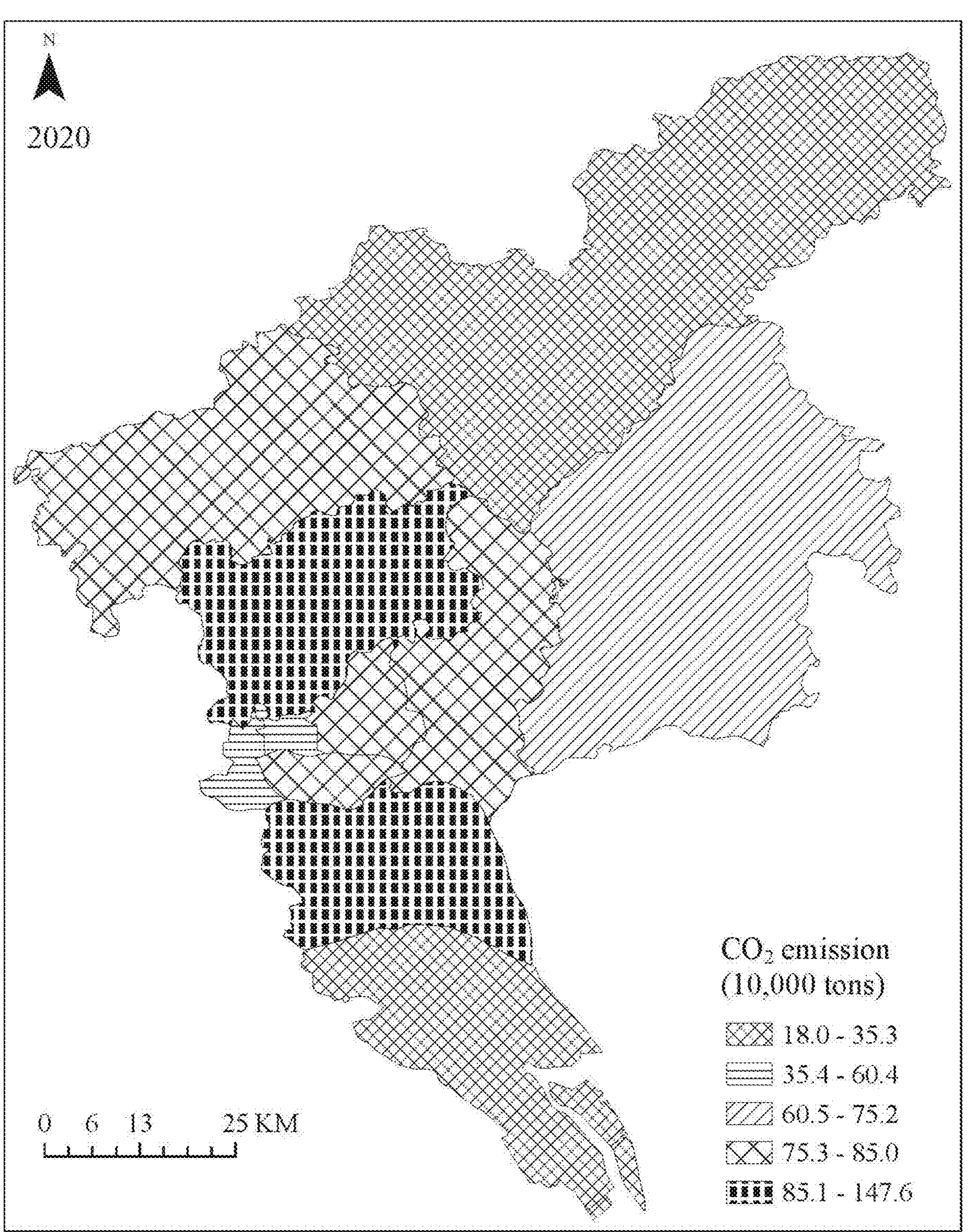
FIG. 6 is a schematic diagram illustrating carbon emission statistic for urban land of counties of city C in 2020 based on 100-meter gridded data simulated in an embodiment of the present disclosure.
Figure 7:
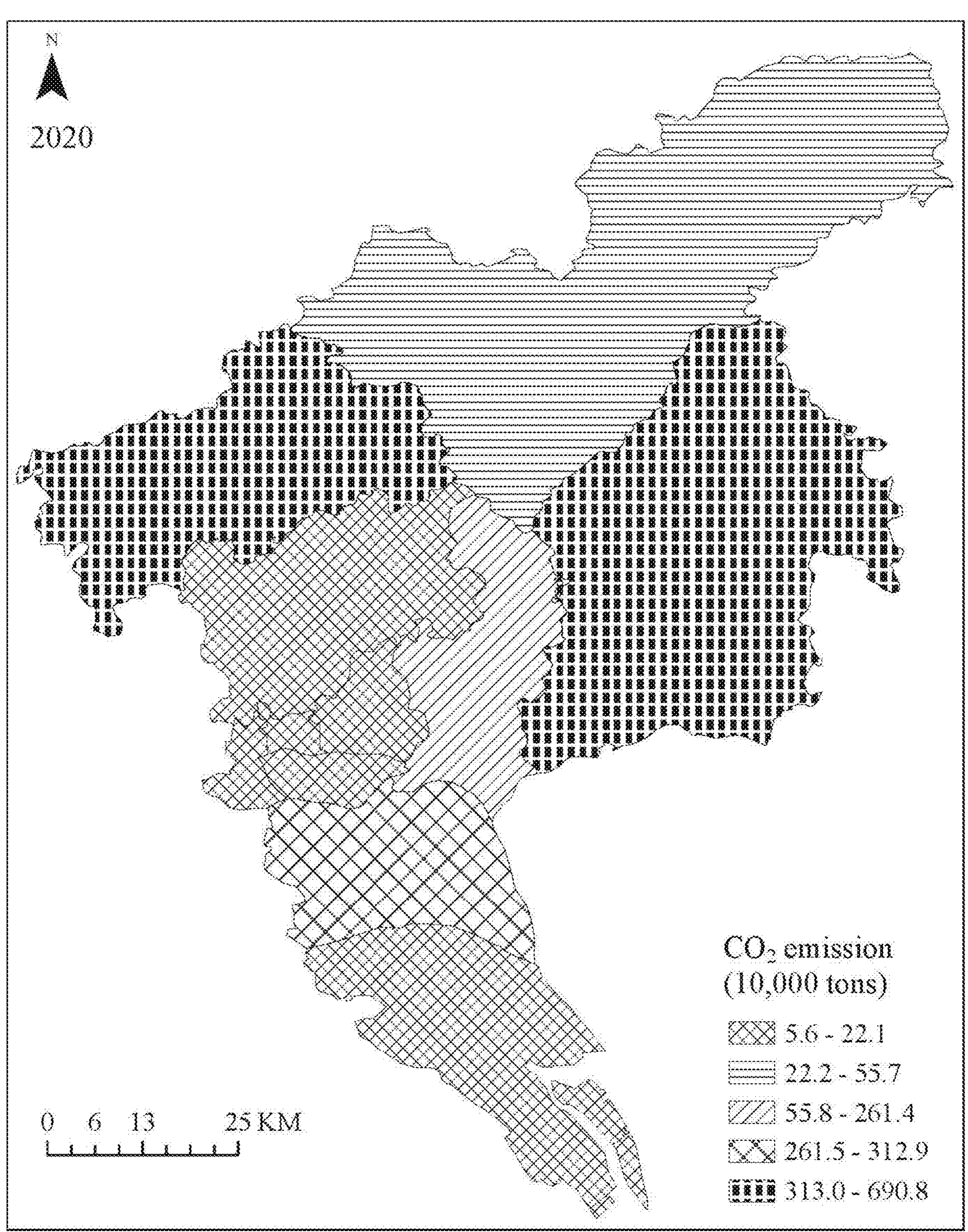
FIG. 7 is a schematic diagram illustrating carbon emission statistic for industrial land of counties of city C in 2020 based on 100-meter gridded data simulated in an embodiment of the present disclosure.
Figure 8:
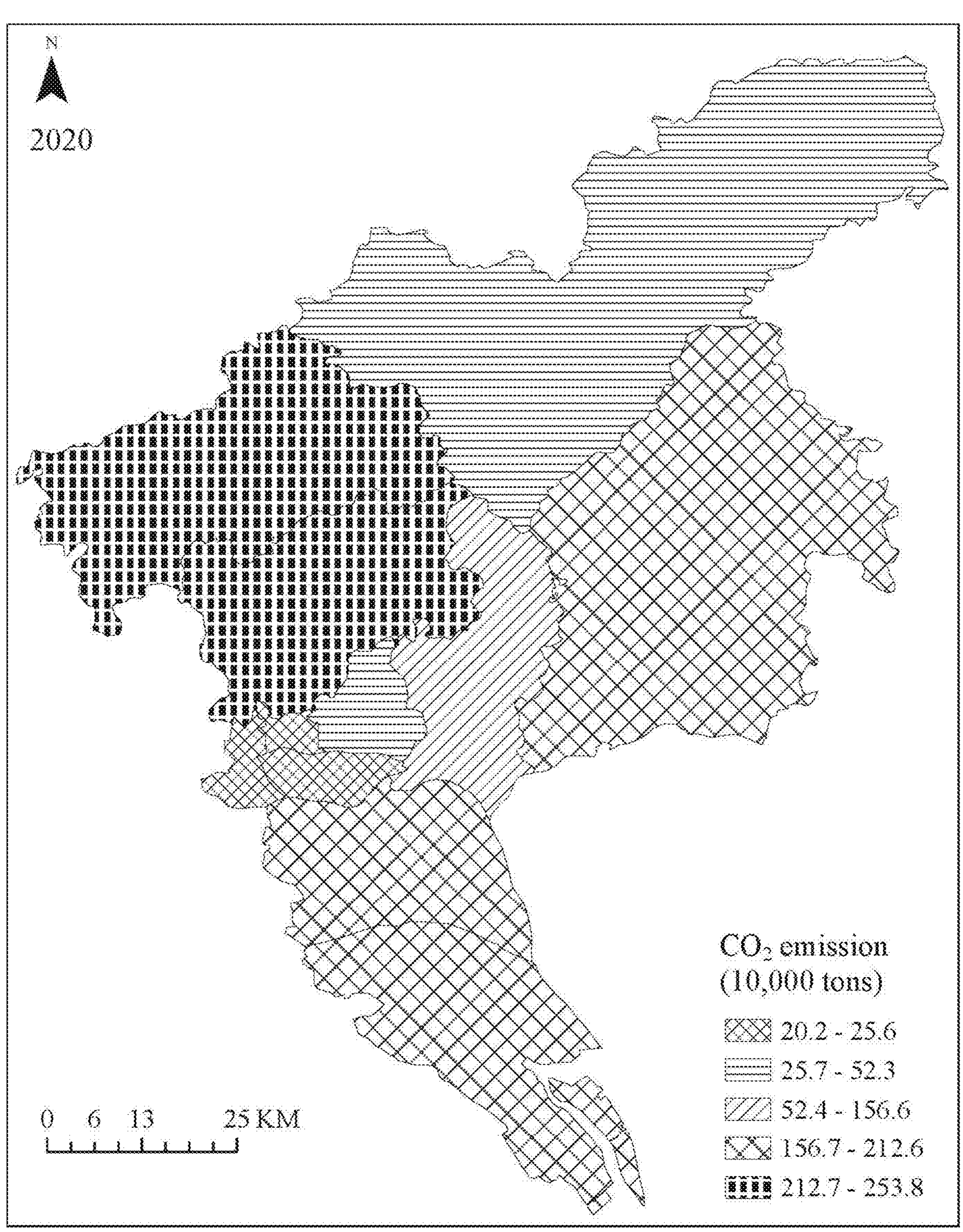
FIG. 8 is a schematic diagram illustrating carbon emission statistic for transportation land of counties of city C in 2020 based on 100-meter gridded data simulated in an embodiment of the present disclosure.
Figure 9:
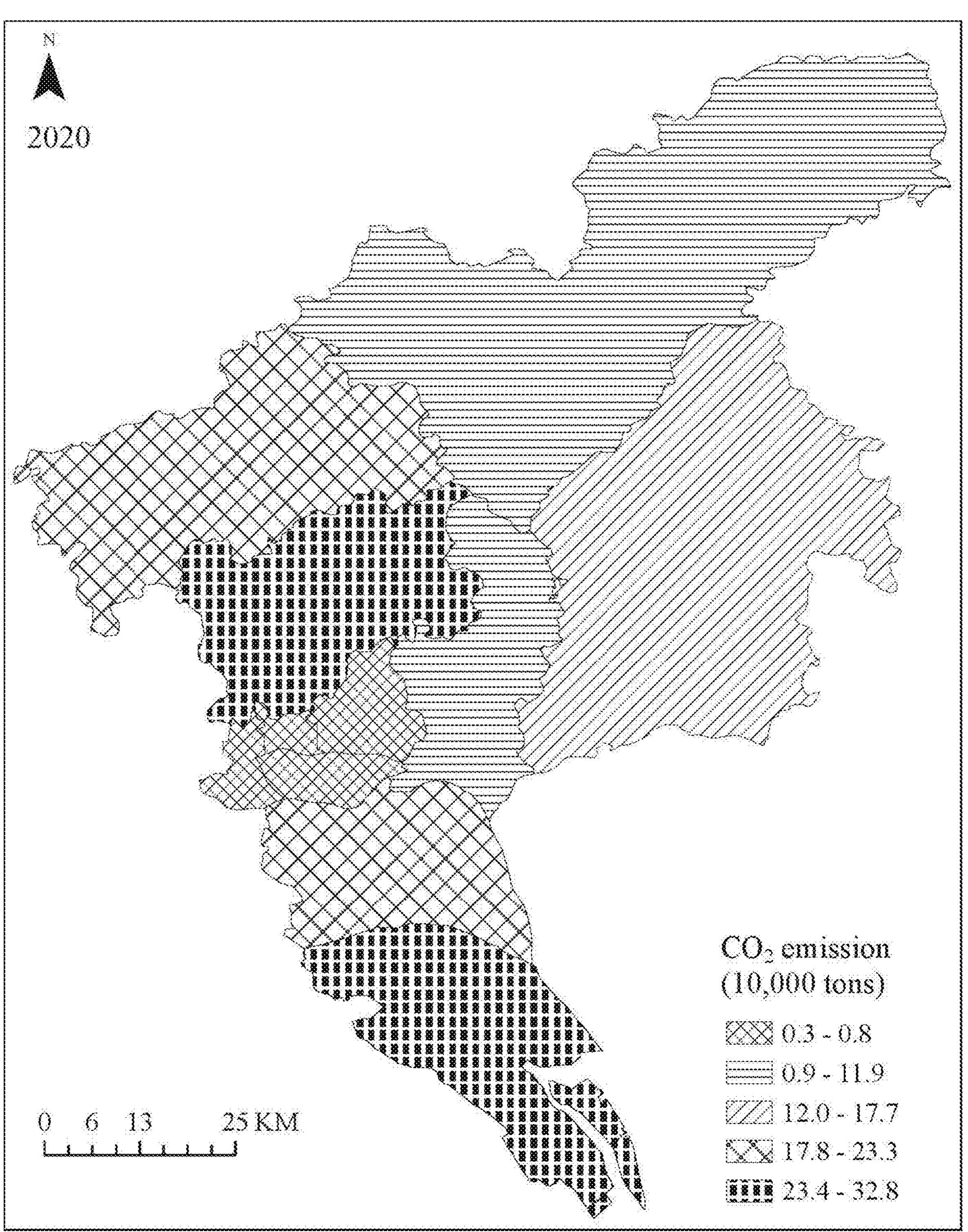
FIG. 9 is a schematic diagram illustrating carbon emission statistic for rural residential land of counties of city C in 2020 based on 100-meter gridded data simulated in an embodiment of the present disclosure.
Figure 10:
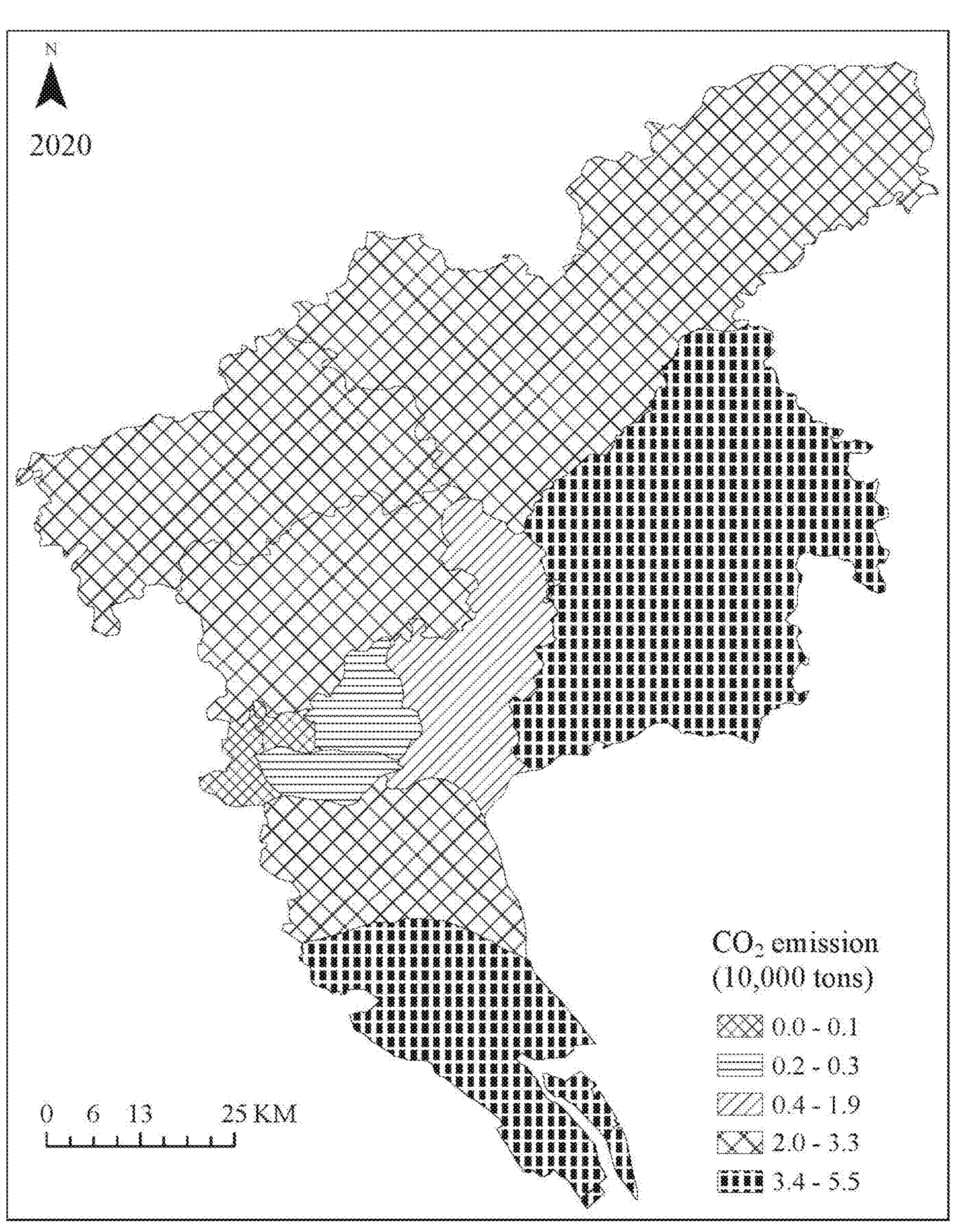
FIG. 10 is a schematic diagram illustrating carbon emission statistic for agricultural land of counties of city C in 2020 based on 100-meter gridded data simulated in an embodiment of the present disclosure.

Provincial-scale, city cluster region-scale, and urban-scale high spatial resolution carbon emission distributions are obtained by inversion using the established carbon emission spatialization model, and results are shown in FIG. 3, FIG. 4, and FIG. 5. Fine spatial resolution results of carbon emissions of different land use types in different industries are shown in FIG. 6, FIG. 7, FIG. 8, FIG. 9, and FIG. 10.

Figure 11:
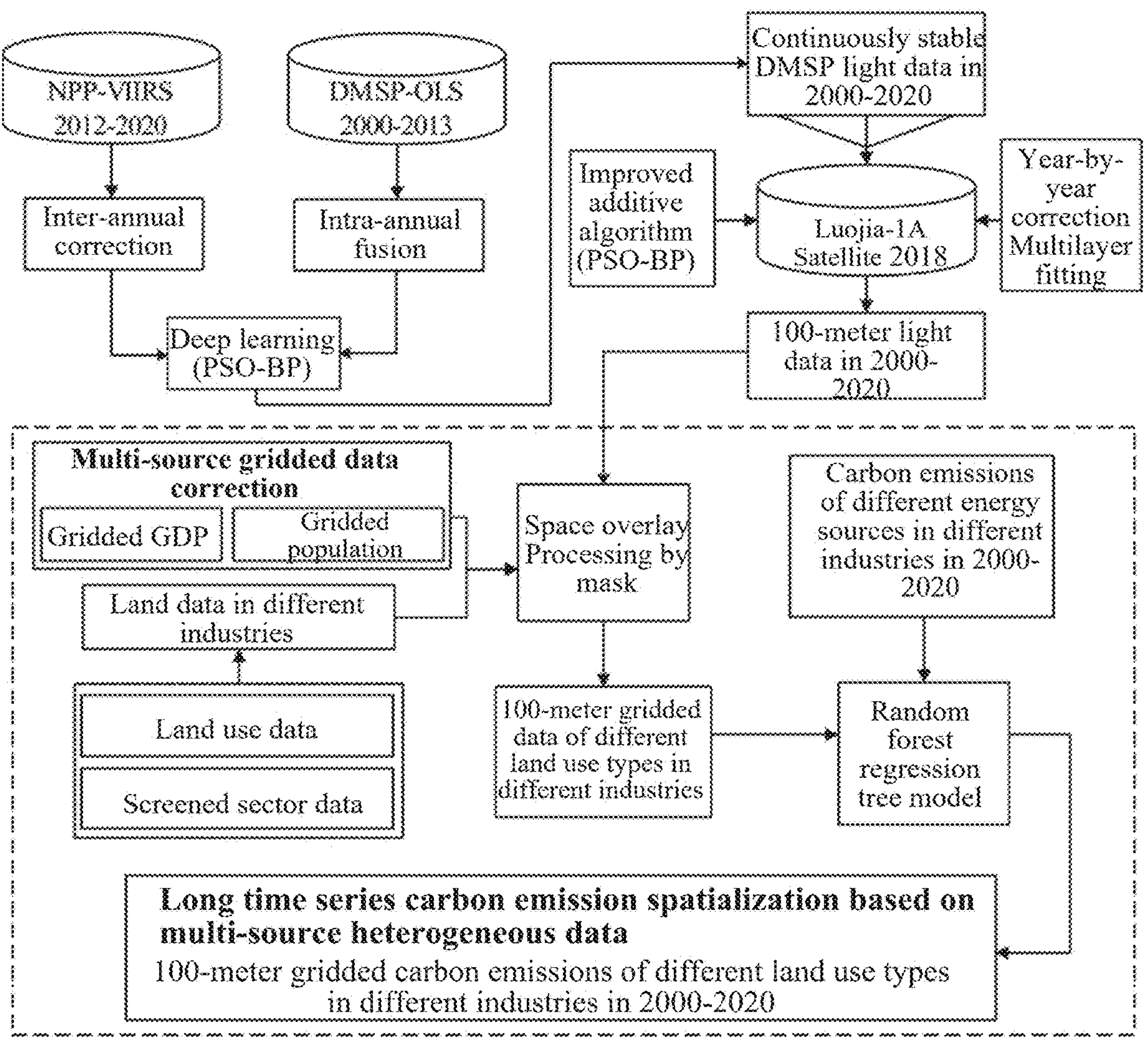
FIG. 11 is a flowchart of complete steps of a 100-meter gridded spatialization method for carbon emissions of different land utilization types based on multi-source heterogeneous data provided in an embodiment of the present disclosure.

In order to guarantee the accuracy and reliability of the simulated $CO_2$ emissions, the spatialized simulated data is verified using a quantitative analysis method such that a verification result is more accurate, objective, and reliable. By comparing a sum of summary values of 100-meter gridded spatialized simulated data of carbon emissions with carbon dioxide emissions of different energy sources in different industries of 30 provinces accounted based on statistical data, results show that the simulated carbon dioxide emissions and the carbon dioxide emissions $R^2$ calculated with the statistical data are 0.9692. Meanwhile, comparing the simulated carbon emissions of province A with the quantity calculated with the statistical data, root mean square errors (RMSEs) are all less than 3%, and $R^2$ is 0.9813. It thus can be seen that the fitting model established in the present disclosure has good accuracy. FIG. 11 is a flowchart of complete steps of the spatialization method for long time series carbon emissions of different land use types in different industries based on multi-source heterogeneous remote sensing data provided in this embodiment.

In an embodiment of the present disclosure, DMSP-OLS nighttime light images are subjected to radiometric calibration and inter-annual correction, and then subjected to long time series fusion correction with NPP-VIIRS nighttime light image data. On this basis, by the particle swarm optimization-BP neural network algorithm improved with the introduced time inertia weight factor, the multilevel model for each layer is established with Luojia-1A Satellite nighttime light data in 2018 as a basis of reference. Downscaling processing from 1-kilometer grid to 100-meter grid is achieved. Comparative research on long time series multi-source 100-meter nighttime light data is achieved. The improvement on spatial resolution further expands the application range of nighttime light remote sensing data. Fine-scale built-up area expansion research and comparison of human activity intensity ranges in an administrative region can be enhanced. The data not only has unique spatio-temporal continuity, but also further expands the spatial fine resolution. The method is an expandable and comparable novel carbon emission spatialization modeling research technique.

A high resolution spatialization inversion model for energy carbon emissions of different land use types in different industries is established by the method of XGBoost regression tree. According to a multilevel remote sensing data input factor, carbon emissions of different land use types in different industries in any region can be estimated with fused 100-meter nighttime light data and gridded GDP and population data. The high resolution spatialization of carbon emissions of various land use types in different industries in an administrative region is realized. A plurality of established spatialization models for carbon emissions of different land use types in different industries can specifically reflect specific features of carbon emissions in different industries born by different land use types. On a finer scale, carbon emissions in different industries in the administrative region are shown. Valid data reference and support can be provided for fine-scale carbon emission quotas in various industries, optimization of industrial structural distribution, and energy conservation and emission reduction.

The preferred embodiments of the present disclosure have been described in detail above, but the present disclosure is not limited to the embodiments. Those skilled in the art may make various equivalent modifications or substitutions without departing from the spirit of the present disclosure, and these equivalent modifications or substitutions are all included in the scope defined by the claims of the present disclosure.

What is claimed is:

1. A 100-meter gridded spatialization method for carbon emissions of different land use types based on multi-source heterogeneous data, comprising:

S1, fitting Luojia-1A Satellite nighttime light data year by year with defense meteorological satellite program-operational linescan system (DMSP-OLS) and national polar-orbiting partnership-visible infrared imaging radiometer (NPP-VIIRS) fused 1-kilometer gridded nighttime light data, performing additive fusion on previous light data and current light data, introducing a time inertia weight factor to improve particle swarm optimization-back propagation (BP) neural network algorithm, and forming 100-meter nighttime light data correctable on a long time series; and S2, simulating a complex nonlinear dynamic changing relationship between multilevel 100-meter gridded data of different land use types in different industries and energy carbon emissions in different industries based on the 100-meter nighttime light data, and establishing a 100-meter spatialization inversion model for energy carbon emissions of different land use types in different industries to achieve a high 100-meter gridded spatial resolution of energy carbon emissions.

2. The 100-meter gridded spatialization method for carbon emissions of different land use types based on multi-source heterogeneous data according to claim 1, wherein step S1 comprises:

S11, collecting multi-source heterogeneous remote sensing data and statistical data, wherein the multi-source heterogeneous data and the statistical data comprise DMSP-OLS nighttime light data, NPP-VIIRS nighttime light data, Luojia-1A Satellite nighttime light data, gridded gross domestic product (GDP) data, gridded population data, gridded land use data, and carbon emission data of different energy sources in different industries accounted based on the statistical data;

S12, preprocessing the multi-source heterogeneous data to obtain an initial dataset;

S13, sequentially performing inter-sensor mutual correction, intra-annual image fusion, and inter-annual image continuity correction on the DMSP-OLS nighttime light data in the initial dataset, and removing outliers from the NPP-VIIRS nighttime light data in the initial dataset; performing inter-annual long time series continuous correction on the preprocessed DMSP-OLS nighttime light data and NPP-VIIRS nighttime light data, and accomplishing matching and fusion of the nighttime light data; and

S14, with the Luojia-1A Satellite nighttime light data as a basis of reference, establishing a multilevel model for each year by the particle swarm optimization-BP neural network algorithm improved with the introduced time inertia weight factor $\omega_{t+}$, and achieving downscaling processing from 1-kilometer gridded data to 100-meter gridded data, thereby obtaining 100-meter nighttime light data continuous on a long time series.

3. The 100-meter gridded spatialization method for carbon emissions of different land use types based on multi-source heterogeneous data according to claim 2, wherein step S2 comprises:

S21, changing a grid resolution and performing projection setting for the 100-meter nighttime light data, the gridded GDP data, and the gridded population data to form a multi-dimensional dataset of a uniform 100-meter resolution and projection; reclassifying land use types of a provincial administrative region by industry, and screening corresponding sector data comprising multilevel 100-meter gridded data of urban land, industrial land, transportation land, rural living land, and agricultural land;

S22, carrying out zonal statistics for the multilevel 100-meter gridded data using spatial overlay and extraction by mask of ArcGIS10.2 software according to a provincial administrative boundary, and acquiring nighttime light, GDP, and total population of provincial-scale multilevel gridded data of all years; and

S23, simulating, using a nonlinear fitting method of extreme gradient boosting (XGBoost) regression, a complex nonlinear fitting dynamic changing relationship between multilevel 100-meter gridded datasets extracted from different land use types and energy carbon emissions in different industries acquired based on provincial-scale statistics, and establishing a 100-meter gridded spatialization inversion model for energy carbon emissions of different land use types in different industries.

4. The 100-meter gridded spatialization method for carbon emissions of different land use types based on multi-source heterogeneous data according to claim 2, wherein the multilevel model for each year established by the particle swarm optimization-BP neural network algorithm improved with the introduced time inertia weight factor $\omega_{t+}$ in the step S14 is as follows:

$$DN_{i,d}^{t+1} = \omega_{v_{i,d}}^{t+1} + c_1 rand()\left(DN_{i,value}^{t} + DN_{i,value}^{t-1}\right) + c_2 rand()\left(DN_{g,value}^{t} + DN_{i,value}^{t-1}\right)$$

$$\omega = \omega_{max} - t \cdot \frac{\omega_{max} - \omega_{min}}{t_{max}}$$

wherein $c_1$ and $c_2$ are learning factors; rand( ) is a random number in a range of (0,1);

$$DN_{i,d}^{t+1}$$

represents 100-meter light data of different regions in a simulation year; and $\omega_{t+}$ represents the time inertia weight factor that changes over time and is weighed year by year.

5. The 100-meter gridded spatialization method for carbon emissions of different land use types based on multi-source heterogeneous data according to claim 3, wherein the nonlinear fitting method of XGBoost regression uses weighted voting for combined strategy decision making:

$$H(x) = c_j^{argmax} \sum_{i=1}^{T} \omega_i h_i^j(x)$$

wherein $\omega_i$ is a weight of an individual learner $h_i$ that fits carbon emissions of different land use types in different industries; and $\omega_i$ is typically required to be greater than or equal to 0, $$\sum_{i=1}^{T} \omega_i = 1.$$

6. The 100-meter gridded spatialization method for carbon emissions of different land use types based on multi-source heterogeneous data according to claim 2, wherein the preprocessing in step S12 comprises resampling, mosaicking, clipping, spatial overlay, and mask processing.

7. The 100-meter gridded spatialization method for carbon emissions of different land use types based on multi-source heterogeneous data according to claim 2, wherein intra-annual fusion is performed on effect data detected by two different sensors in a same year from the DMSP-OLS nighttime light data using the ArcGIS 10.2 software, and a specific calculation formula is as follows:

$$\left\{\begin{array}{l} DN_{(n,i)} = 0, \text{ when } DN^a_{(n,i)} = 0 \text{ or } DN^b_{(n,i)} = 0 \\ DN_{(n,i)} = \dfrac{DN^a_{(n,i)} + DN^b_{(n,i)}}{2}, \text{ others} \end{array}\right\}.$$

8. The 100-meter gridded spatialization method for carbon emissions of different land use types based on multi-source heterogeneous data according to claim 2, wherein a specific calculation formula for the performing inter-annual long time series continuous correction on the preprocessed DMSP-OLS nighttime light data and NPP-VIIRS nighttime light data is as follows:

$$\left\{\begin{array}{l} DN_{(n,i)} = 0, \text{ when } DN_{(n+1,i)} = 0 \\ DN_{(n,i)} = DN_{(n-1,i)}, \text{ when } DN_{(n+1,i)} > 0 \text{ and } DN_{(n-1,i)} > DN_{(n,i)} \\ DN_{(n,i)} = DN_{(n,i)}, \text{ others} \end{array}\right\}.$$

9. The 100-meter gridded spatialization method for carbon emissions of different land use types based on multi-source heterogeneous data according to claim 1, further comprising:

acquiring actual statistical quantities of energy carbon emissions in different industries in some regions, comparing the actual statistical quantities in different industries with carbon emissions of the selected regions estimated by the 100-meter spatialization inversion model for energy carbon emissions of different land use types in different industries, and verifying the reliability of the 100-meter spatialization inversion model for energy carbon emissions of different land use types in different industries.

10. The 100-meter gridded spatialization method for carbon emissions of different land use types based on multi-source heterogeneous data according to claim 2, further comprising:

acquiring actual statistical quantities of energy carbon emissions in different industries in some regions, comparing the actual statistical quantities in different industries with carbon emissions of the selected regions estimated by the 100-meter spatialization inversion model for energy carbon emissions of different land use types in different industries, and verifying the reliability of the 100-meter spatialization inversion model for energy carbon emissions of different land use types in different industries.

11. The 100-meter gridded spatialization method for carbon emissions of different land use types based on multi-source heterogeneous data according to claim 3, further comprising:

acquiring actual statistical quantities of energy carbon emissions in different industries in some regions, comparing the actual statistical quantities in different industries with carbon emissions of the selected regions estimated by the 100-meter spatialization inversion model for energy carbon emissions of different land use types in different industries, and verifying the reliability of the 100-meter spatialization inversion model for energy carbon emissions of different land use types in different industries.

12. The 100-meter gridded spatialization method for carbon emissions of different land use types based on multi-source heterogeneous data according to claim 4, further comprising:

acquiring actual statistical quantities of energy carbon emissions in different industries in some regions, comparing the actual statistical quantities in different industries with carbon emissions of the selected regions estimated by the 100-meter spatialization inversion model for energy carbon emissions of different land use types in different industries, and verifying the reliability of the 100-meter spatialization inversion model for energy carbon emissions of different land use types in different industries.

13. The 100-meter gridded spatialization method for carbon emissions of different land use types based on multi-source heterogeneous data according to claim 5, further comprising:

acquiring actual statistical quantities of energy carbon emissions in different industries in some regions, comparing the actual statistical quantities in different industries with carbon emissions of the selected regions estimated by the 100-meter spatialization inversion model for energy carbon emissions of different land use types in different industries, and verifying the reliability of the 100-meter spatialization inversion model for energy carbon emissions of different land use types in different industries.

14. The 100-meter gridded spatialization method for carbon emissions of different land use types based on multi-source heterogeneous data according to claim 6, further comprising:

acquiring actual statistical quantities of energy carbon emissions in different industries in in some regions, comparing the actual statistical quantities in different industries with carbon emissions of the selected regions estimated by the 100-meter spatialization inversion model for energy carbon emissions of different land use types in different industries, and verifying the reliability of the 100-meter spatialization inversion model for energy carbon emissions of different land use types in different industries.

15. The 100-meter gridded spatialization method for carbon emissions of different land use types based on multi-source heterogeneous data according to claim 7, further comprising:

acquiring actual statistical quantities of energy carbon emissions in different industries in some regions, comparing the actual statistical quantities in different industries with carbon emissions of the selected regions estimated by the 100-meter spatialization inversion model for energy carbon emissions of different land use types in different industries, and verifying the reliability of the 100-meter spatialization inversion model for energy carbon emissions of different land use types in different industries.

16. The 100-meter gridded spatialization method for carbon emissions of different land use types based on multi-source heterogeneous data according to claim 8, further comprising:

acquiring actual statistical quantities of energy carbon emissions in different industries in some regions, comparing the actual statistical quantities in different industries tries with carbon emissions of the selected regions estimated by the 100-meter spatialization inversion model for energy carbon emissions of different land use types in different industries, and verifying the reliability of the 100-meter spatialization inversion model for energy carbon emissions of different land use types in different industries.

* * * * *